United States Patent [19]
Salsburg

[11] Patent Number: 5,452,440
[45] Date of Patent: Sep. 19, 1995

[54] METHOD AND STRUCTURE FOR EVALUATING AND ENHANCING THE PERFORMANCE OF CACHE MEMORY SYSTEMS

[75] Inventor: Michael A. Salsburg, West Chester, Pa.

[73] Assignee: Zitel Corporation, Fremont, Calif.

[21] Appl. No.: 93,073

[22] Filed: Jul. 16, 1993

[51] Int. Cl.⁶ .............................................. G06F 11/34
[52] U.S. Cl. .................. 395/463; 395/184.01; 395/460; 395/500; 364/285; 364/224.1
[58] Field of Search ............... 395/575, 400, 425, 250, 395/700, 725; 371/10.1, 15.1, 21.1, 40.1; 364/285, 224.1, 246.12, 264.4

[56] References Cited

U.S. PATENT DOCUMENTS

| | | | |
|---|---|---|---|
| 4,490,782 | 12/1984 | Dixon et al. | 364/200 |
| 4,669,043 | 5/1987 | Kaplinsky | 364/200 |
| 4,835,686 | 5/1989 | Furuya et al. | 364/246.12 |
| 4,920,478 | 4/1990 | Furuya et al. | 364/243.4 |
| 5,043,885 | 8/1991 | Robinson | 364/243.41 |
| 5,133,060 | 7/1992 | Weber et al. | 395/425 |
| 5,241,640 | 8/1993 | Hisano et al. | 395/425 |
| 5,325,504 | 6/1994 | Tipley et al. | 395/425 |
| 5,325,509 | 6/1994 | Lautzenheiser | 395/425 |
| 5,335,317 | 8/1994 | Hisano et al. | 395/425 |
| 5,353,430 | 10/1994 | Lautzenheiser | 395/425 |
| 5,359,713 | 10/1994 | Moran et al. | 395/400 |

OTHER PUBLICATIONS

Performance Analysis of Buffer Coherency Policies in a Multisystem Data Sharing Environment, Asit Dan, pp. 289–305, IEEE Mar. 1993.

Improving Disk Cache Hit-Ratios Through Cache Partitioning, Dominique Thiébaut, pp. 665–676, IEEE vol. 41, No. 6 Jun. 1992.

"An Analytical Cache Model," *ACM Transactions on Computer Systems*, vol. 7, No. 2, May 1989, pp. 184–215, Agarwal et al.

"A File-Based Adaptive Prefetch Caching Design," Shih et al., IBM T. J. Watson Research Center, 1990 IEEE.

"Method for Predicting the Performance of Set-Associative Cache Memories," 700 IBM Technical Disclosure Bulleting 31 (1989) Jan., No. 8, Armont, N.Y., U.S.

"Optimal Partioning of Cache Memory," Harold S. Stone, IEEE Transactions of Computers., vol. 41, No. 9, Sep. 1992.

(List continued on next page.)

Primary Examiner—Robert W. Beausoliel, Jr.
Assistant Examiner—Dieu-Minh Le
Attorney, Agent, or Firm—S. Caserza; Flehr Hohbach Test Albritton & Herbert

[57] ABSTRACT

Method and structure for collecting statistics for quantifying locality of data and thus selecting elements to be cached, and then calculating the overall cache hit rate as a function of cached elements. LRU stack distance has a straight-forward probabilistic interpretation and is part of statistics to quantify locality of data for each element considered for caching. Request rates for additional slots in the LRU are a function of file request rate and LRU size. Cache hit rate is a function of locality of data and the relative request rates for data sets. Specific locality parameters for each data set and arrival rate of requests for data-sets are used to produce an analytical model for calculating cache hit rate for combinations of data sets and LRU sizes. This invention provides algorithms that can be directly implemented in software for constructing a precise model that can be used to predict cache hit rates for a cache, using statistics accumulated for each element independently. The model can rank the elements to find the best candidates for caching. Instead of considering the cache as a whole, the average arrival rates and re-reference statistics for each element are estimated, and then used to consider various combinations of elements and cache sizes in predicting the cache hit rate. Cache hit rate is directly calculated using the to-be-cached files' arrival rates and re-reference statistics and used to rank the elements to find the set that produces the optimal cache hit rate.

19 Claims, 3 Drawing Sheets

OTHER PUBLICATIONS

"A Multiple Workload Approach to Cache Planning,", McNutt et al., pp. 9-15.

An Analytical Cache Model, Aragwal et al., Abstract, Apr. 25, 1988 Computer Systems Lab., Stanford University, Stanford, Calif. 94305.

A Measure of Program Locality and Its Application, Bunt et al., Abstract, Dept. of Computational Science, University of Saskatchewan 1984.

An Approximate Analysis of the LRU and FIFO Buffer Replacement Schemes, Dan et al., Abstract, University of Massachusetts, Amherst, Mass.

MVS Memory Management, Friedman, Abstract, Landmark Systems Corp. Vienna, Va.

Locality-Based Approach to Characterize Data Set Referencing Patterns.

Measurement and Analysis of Locality Phases in File Referencing Behaviour Majumdar et al, Abstract, Dept. of Computational Science, Saskatchewan University.

A Multiple Workload Approach to Ache Planning, McNutt et al., Abstract, International Business Machines, Corporation, San Jose, Calif.

A Simple Statistical Model of Cache Reference Locality and Its Application to Cache Planning, Measurement and . . . , McNutt, IBM, San Jose, Calif., pp. 203, 1991.

Workload Characterization for Storage Modeling, Olcott, Abstract, Schering-Plough Corporation, Memphis, Tenn. pp. 705-716, 1991.

Disk Cache-Miss Ratio Analysis and Design Considerations, A. J. Smith, University of California, Berkeley, ACM Trans. on Com. Sys., vol. 3, No. 3, Aug.

Empirical Results on Locality in Database Referencing, Verkamo, Dept. of Computer Science, University of Helsinki, 1985, ACM.

METHOD AND STRUCTURE FOR EVALUATING AND ENHANCING THE PERFORMANCE OF CACHE MEMORY SYSTEMS

FIELD OF THE INVENTION

This invention relates to methods and structures that can be used to predict the effectiveness of using a Least Recently Used (LRU) type of cache memory to improve computer performance. The method and structure collects a unique set of statistics for each element that can be cache enabled or cache disabled, and uses these and other known statistics to create a unique probabilistic model. This model is used to predict the effects of including or removing the element from the set of all elements that are to be cached. Finally, the method and structure of this invention can be used to rank the elements (using results of the probabilistic model) to determine the best elements to be cached. The method and structure of this invention is useful for, but not limited to, the analysis of measured systems to produce performance reports. It is also used as a real-time dynamic cache management scheme to optimize the performance of cached systems.

DESCRIPTION OF THE PRIOR ART

1. Overview

Caching is a technique used to improve computer performance at all levels of the computer storage hierarchy. For example, computer memory can vary in performance and cost. When the Central Processing Unit (CPU) requests data for processing, data is often moved from slower, less costly memory to very high speed (and more costly) memory that can be accessed directly by the CPU. The higher speed memory is called the CPU memory cache. If the data in this memory is re-referenced many times, than it is said that there is a high cache hit rate. If the data is not re-referenced by the CPU, then it is replaced by other data that is needed. If data is never re-referenced, but always flushed out due to new data requests, then the cache hit rate is said to be very low. A good description of memory caching is presented in Friedman, Mark B, MVS Memory Management, CMG'91 Proceedings, 747–771.

This same technique is used for spinning disks. A relatively small amount of high speed semiconductor memory is used as a cache for the less costly and slower spinning media. When data is requested from the spinning media, it is first moved into cache memory. If the same data is re-referenced many times, it does not have to be retrieved from the spinning disk and, therefore, I/O delays are diminished. A discussion of disk cache schemes is presented in Smith, Alan J, "Disk Cache-Miss Ratio Analysis and Design Considerations," ACM Transactions on Computer Systems, v. 3 #3, 761–203.

For magnetic tapes, caching techniques are employed in two ways. First, a memory cache is available for some tape systems. This memory cache is similar to the cache used for spinning disks. A second kind of cache is also used. For robotic tape libraries, there are a limited number of tape readers being shared by a large silo of tapes. If tapes are re-referenced often this could be considered as a cache hit where the cache is now the tape reader. To achieve a specific level of performance (such as an average of two minutes to access tape data), a number of tape readers must be configured. This number is directly related to the hit rate of the tapes that are placed in the readers. A high hit rate implies less tape readers are needed to meet the requested performance level. A detailed discussion of caching and cache modeling techniques throughout the storage hierarchy is presented in Olcott, Richard, "Workload Characterization for Storage Modeling", CMG '91 Proceedings, 705–716.

2. The LRU Process

Most cache management systems are based on the Least Recently Used (LRU) algorithm. The LRU algorithm uses a stack of a limited size. Specific elements are specified as being cache enabled. For example, for disk caching, specific files or specific disks are the elements that are cache enabled or disabled. For memory caching, specific addresses or pages are assigned to the cache. The most recently used request is placed on the top of the stack. The least recently used request is at the bottom of the stack. When a new request arrives, and there is no more room in the stack, the least recently used request is replaced by the new request. Table #1 shows an arrival process of ten requests for tracks of disk data. Disks 1 and 2 are enabled. The size of the LRU stack is three. The cache memory can hold three disk track's worth of data. Column one shows the sequence number for the arrival. Column two shows the disk address and the disk's track address for the request. Columns three through five show the contents of the LRU stack. Column six indicates if the arrival was a cache hit. The total cache hit rate for the ten I/Os is the sum of the number of hits over the total number of arrivals.

TABLE 1

| Arrival | Disk/Track | LRU Position 1 | LRU Position 2 | LRU Position 3 | Cache Hit |
|---------|------------|----|----|----|-----------|
| 1 | 1/5 | 1/5 | | | |
| 2 | ½ | ½ | 1/5 | | |
| 3 | 2/5 | 2/5 | ½ | 1/5 | |
| 4 | 1/5 | 1/5 | 2/5 | ½ | Yes |
| 5 | 1/5 | 1/5 | 2/5 | ½ | Yes |
| 6 | ½ | ½ | 1/5 | 2/5 | Yes |
| 7 | 1/5 | 1/5 | ½ | 2/5 | Yes |
| 8 | 2/6 | 2/6 | 1/5 | ½ | |
| 9 | 2/5 | 2/5 | 2/6 | 1/5 | |
| 10 | 2/6 | 2/6 | 2/5 | 1/5 | Yes |

In the example of Table 1, the cache hit rate is 50%. Notice that the cache hit rate is a function of the arrival of data requests and the size of the LRU stack. The size of the LRU stack is determined by the size of cache memory. If the cache memory had been able to hold four track's worth, the eighth arrival would have pushed request 2/5 to the fourth position and the ninth arrival would have been a cache hit.

The LRU caching algorithm is effective due to a quality that has been observed in computer systems called locality of reference. Although this quality has not been exactly quantified in the past, it has been shown empirically to follow certain principles. First, during any interval of time, references are concentrated on a small set of the elements assigned to the cache. Secondly, once an element is referenced, the probability of it being re-referenced is highest right after it is referenced, with the probability of re-referencing diminishing as the time interval since the first reference increases.

Prior Art in Predicting Cache Hit Rates

The most common technique used to predict cache hit rates is to use a discrete event simulator. The input for the simulator is an I/O trace file. This file has an entry for each I/O that arrived during the measurement interval (which is usually about five minutes). In each entry is the unique disk name and the address on the disk for the READ or WRITE of the data. Using the address, the track for the address is calculated. An LRU stack is implemented in the simulation. This LRU stack is then used to determine if, in an actual system of similar configuration, the I/O would be a cache hit or miss. Basically, the simulation models the system's LRU stack behavior and then reports the percentage of I/Os that would have resulted in a cache hit or miss. The main drawback to this technique is that, if one wants to know how the cache hit rate would be affected by doubling cache size, the simulation has to be re-run again. In most of the prior art described here, techniques have been explored to eliminate the necessity to re-run the simulation. Instead, these techniques use statistics derived from the original simulation and predict the behavior as a result of a change in the cache size or the re-combination of elements that use the cache.

Prior art has used statistical models to predict the cache hit rate. A measure of locality of data by fitting observed data to the empirical Branford-Zipf distribution is proposed in Majundar, Shikharesh and Bunt, Richard B, Measurement and Analysis of Locality Phases in File Referencing Behavior, Performance Evaluation Review 1986 180–192 and Bunt, Richard B, Murphy, Jennifer M, et al, "A Measure of Program Locality and Its Application", Performance Evaluation Review, 1984. It has been found that this distribution could be fit to the frequency of book references in the Library Sciences or to word references. This was then extended in Ho, Lawrence Y, "Locality-Based approach to Characterize Data Set Referencing Patterns", CMG '89 Proceedings, 36–47 to use track references in a disk cache. In these approaches, locality was measured over all elements of the cache. It was not quantified for the individual elements of the cache, nor was it shown how these elements affected each other when combined in the cache.

A measure of "stack distance" is used to quantify locality of data in Verkamo, A. I, Empirical Results on Locality in Database Referencing, Performance Evaluation Review 1985, 49–58 and the aforementioned reference of Ho. If 90% of the requests are a stack distance of 1, then 90% of the time the reference was found on the top position of the LRU stack.

In Dan, Asit and Towsley, Don, An Approximate Analysis of the LRU and FIFO Buffer Replacement Schemes, Proceedings 1990 ACM Sigmetrics, 143–152., a model of the "LRU Buffer Replacement Scheme" is presented using the "Independent Reference Model (IRM)". The term "LRU buffer" refers to the LRU stack as mentioned above. In this model, many items are grouped into a partition, where there is a given probability of a request for a buffer from an item in the partition. The stationary probabilities of the buffer being occupied by a number of requests from a partition are then calculated. The Independent Reference Model is explored in additional detail in Agarwal, A, et. al, "An Analytical Cache Model," Computer Systems Laboratory, Stanford University, 1988. In these models, it is assumed that all requests for files in a partition are equally likely. It also assumes that the requests for the buffer are not themselves a function of the buffer size.

Recently, Bruce McNutt has presented a model of cache reference locality using a statistical model, which is fitted to pools of data. This is described in McNutt, Bruce and Murray, James, "A Multiple Workload Approach to Cache Planning," CMG '87 Proceedings, 9–15, McNutt, Bruce, "A Simple Statistical Model of Cache Reference Locality, and Its Application to Cache Planning, Measurement and Control," Proceedings of CMG '91 203–211 and McNutt, Bruce, A Simple Statistical Model of Cache Reference Locality, and Its Application to Cache Planning, Measurement and Control, CMG Transactions—Winter 1993, 13–21. Although data pools refer to groups of disks which may share a controller level cache, the analysis applies to individual data sets that share the cache. In the model, each pool is characterized by a "single reference residency time" and an "average residency time" (which is also called the "average holding time"). The single reference residency time, which is also called the "back end" of the average residency time, is the average amount of time taken for an entry in the LRU stack to migrate to the end of the list and be removed, assuming that there are no more references. For tracks that are re-referenced, there is a "front end" residency time, which is the average amount of time that the track remains in the LRU stack before its last reference and subsequent removal from the LRU stack. The average residency time is then the sum of the "front end" and "back end" times.

SUMMARY

This invention provides a unique method and structure for collecting the necessary statistics for quantifying locality of data. Once the necessary statistics are collected, the method and structure of this invention can then choose the best elements to be cache enabled, and can calculate the overall cache hit rate as a function of the elements that are sharing the cache. In accordance with the teachings of this invention, the LRU stack distance has a straight-forward probabilistic interpretation and is part of the statistics which are used to quantify locality of data for each element that is being considered for caching. In accordance with the teachings of this invention, the request rate for additional slots in the LRU stack are a function of the request rate for the element and a function of the size of the LRU itself. The cache hit rate is a function of the locality of data and the relative request rates for elements, but it is not the rate at which the overall cached data is being requested.

An element can be a data set when disk caching is being performed, a tape cartridge when a library of tape cartridges are being cached, or a memory buffer when CPU memory is being cached. To simplify the description of this invention, an exemplary embodiment is described in which disk caching is performed in accordance with this invention. However, it is to be understood that the teachings of this invention apply to all caching techniques which utilize an LRU stack.

This invention uses specific locality parameters for each data set and the arrival rate of requests for the data sets to produce an exact analytical model which can be used to calculate the cache hit rate for combinations of various data sets, given a specific size of the LRU stack.

In contrast to the prior art, in which the residency time is calculated after sorting a trace of I/O events by track number and then calculating the various time parameters using the time stamps in the trace, one embodiment of this invention uses statistics that can be gathered in real time with no need for sorting. The results of the invention is an exact method for choosing which files will improve the overall cache hit rate, along with a method to calculate that hit rate given the data set's locality statistics, the arrival rates of the data sets and the LRU stack size.

Using a suitable model, it is shown that an empirical statistical model can be established for each element. These models can then be used to predict the cache hit rates for combinations of the elements. It can also be used to explore how the size of cache can affect the cache hit rate of the elements. One interesting point to be raised about a model such as McNutt's is that time in the form of "residency time" is included in the statistical model. In accordance with the teachings of this invention, I have determined that, in essence, the parameter of time has no bearing on the model. A simple example shall illustrate this. Assume that a single file is using the cache. The cache hit rate will be assumed to be h. According to McNutt's model, the cache hit rate is a function of the average residency time. Now assume that the requests for data from the file are issued at twice the I/O rate. The residency time will be halved and, I have discovered, h will remain invariant.

DETAILED DESCRIPTION

Figure 1:
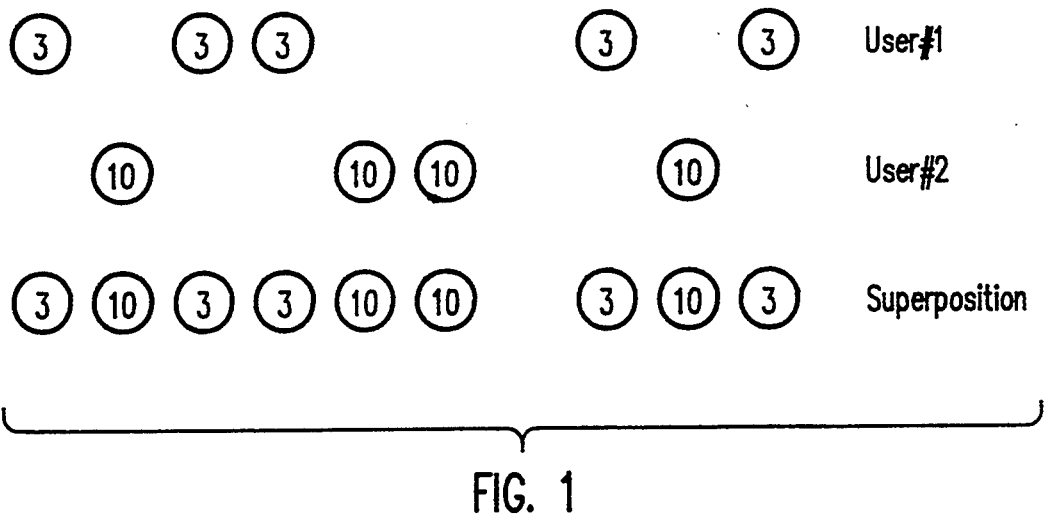
FIG. 1 depicts the superposition of the arrival process in a system having two users.

This invention consists of methods and structures that collect in real time specific locality parameters and the I/O request rate for each data set, and which then selects the optimal data sets for including in a disk cache. It can also calculate the exact cache hit rate for the collection of data sets. The invention is presented in exemplary form in the context of disk caching, but is not restricted solely to this domain. It applies equally when considering management of tape cartridge drives, CPU level memory cache, or any process where the LRU algorithm is employed.

Before delving into a concise model, the following rather simple scenarios provide some intuition into the operation of cache systems. Consider a single data set or file that is using the cache. The file consists of t tracks of data, where the track size is assumed to be 32,000 bytes. If the total cache size is 16 Megabytes, then the size of the LRU stack is 500. If $t < 500$, then after a "sufficient" amount of time, all tracks will be present in the LRU list and all references to the file will result in a cache hit. After the "warm-up" period, since the probability of a cache hit is 1, the cache hit rate will be 100%. This scenario is not normally the case. Alternatively, if the file is 64 Megabytes large, then one quarter of the file can be stored in the cache. If all references are uniformly distributed over the file, then there is a probability of 0.25 that a reference will be made to a track in cache, which yields a cache hit rate of 25%. Fortunately, file references are rarely uniformly distributed. In the most optimistic case, if a single track is being referenced 100% of the time, then the cache hit rate will be 100% rather than 25%. Between these two extremes lay the reality of real world processing.

A very common type of reference to a file is sequential. Assume that there are 10 records in each 32,000 byte track of the file. If one user is sequentially reading the file, a track gets read into cache memory for the first record in the track. The next nine reads are then satisfied from the track which has been stored in cache memory. Note that no records are re-referenced, but the cache hit rate is nine out of ten, or 90%. In this example, the size of the cache could be one track large or 100 tracks large—in either case, the hit rate will be the same. Add to this scenario a second user accessing a different file sequentially, but sharing the same cache memory. Given two tracks' worth of cache, each user could realize a 90% hit rate, with the overall cache having a 90% hit rate.

None of the above rather simple scenarios require a detailed model to understand. However, if the last scenario is changed slightly, the complications show the necessity for a detailed model. Using the above scenario of two users sequentially accessing files sharing the same cache, assume that there is only one track's worth of cache memory available. Also assume that each user is accessing the file at a different rate. For example, File#1 could be accessed at a rate of 10 accesses per second, while File#2 is accessed at the rate of one per second. For modeling purposes, we only need to know that File#1 is being accessed 10 out of 11 times ($1/11 \approx 0.0909$) and File#2 is being accessed 1 out of 11 times ($1/11 \approx 0.0909$). A cache hit will only occur when two of the same user's requests arrive one after the next. Otherwise, the cache will continually be alternating tracks. In accordance with the teachings of this invention, a novel cache memory model specifies that the probability of having a cache hit is not affected by elapsed time, but rather by the ratio of the request rates of File#1 and File#2. For example, the above scenario does not change if File#1 is accessed at a rate of 1 per second and File#2 is accessed at a rate of 0.1 per second.

The Statistics Used as Model Input

In accordance with the teachings of this invention, a novel cache memory model uses the fraction of memory accesses or "I/Os" for each file with respect to the total number of I/O's for all files, which is identified using the Greek symbol for lambda ($\lambda$), together with a set of statistics that identify cycles of re-reference on a track basis for each file. These statistics are identified using the Greek letter gamma ($\alpha$). In the previous scenario, the statistics would be:

$$\lambda = \begin{bmatrix} .9091 \\ .0909 \end{bmatrix} \quad (1)$$

$$\gamma = \begin{bmatrix} .9 & 0 & 0 & 0 & 0 \\ .9 & 0 & 0 & 0 & 0 \end{bmatrix}$$

where the arrival rates are a column vector $\lambda$ and the cycles of re-reference for each file are a row of the $\gamma$ matrix. In this scenario, the probability of a re-reference given one track for a file is the first entry in the row of the γ matrix. As in the above-mentioned references of Verkamo and Ho, this is a measure of "stack distance". The difference is that here, stack distances greater than one are calculated. In addition, this stack distance is given a probabilistic meaning. The probability of a re-reference given two tracks is in the second place. This row of re-reference can actually extend for the total number of tracks in the file. In the above scenario, the probability of re-reference given additional tracks in cache are near zero.

There are many scenarios where the second and subsequent elements of the row are non-zero. For example, assume that two users are accessing File#1 in a sequential manner. The requests by the two users can be observed as a superposition of two arrival processes. Assume that User#1 and User#2 requests are for tracks 3 and 10 of File#1 respectively. FIG. 1 graphically shows the superposition of the arrival processes.

In FIG. 1, assume that the first I/O arrived at the far left and subsequent I/Os arrive to the right of it. We will also evaluate the arrival process as if the file is alone in cache. Given one track in cache, two of the nine I/Os were re-referenced with no I/Os in between. This is the number of cache hits that would occur with one track of cache. If there were two tracks of cache, there would be five more cache hits, for a total of seven cache hits. The re-reference statistics for this small sample would then be:

$$\gamma_1 = [0.22\ 0.56\ 0\ 0\ 0] \qquad (30)$$

Probabilistically, $\gamma_{11}=0.22$ is the conditional probability that, given one track is occupied by File#1, there will be a re-reference (i.e. 2/9 cache hits). Furthermore, $\gamma_{12}=0.56$ is the conditional probability that, given two tracks are occupied by File#1, that there will be a re-reference that would not occur if only one track had been occupied by File #1 (i.e. 5/9 additional, level 2, cache hits). Note that, if two tracks are available, then the total conditional probability of re-reference, given that two tracks are occupied by File#1 will be 0.78.

Method of Collecting the Statistics

In accordance with this invention, the re-reference statistics for each file are used with the arrival rate for the file to calculate the overall cache hit rate, given that the files are sharing the cache memory. In addition, the re-reference statistics are used alone to determine which files are optimal for caching. To determine these re-reference statistics, an LRU stack is used for each file. As I/Os are processed (either in real time or using an I/O trace), the position in the LRU stack is used to determine these statistics. Using the preceding example, it can be shown that the frequency of hits at a level of the LRU stack determines the conditional frequency of a re-reference given the number of tracks occupied by the file.

TABLE 2

| Arrival | Track | 1 | 2 | Level of Cache Hit |
|---------|-------|----|----|---------------------|
| 1 | 3 | 3 | | |
| 2 | 10 | 10 | 3 | |
| 3 | 3 | 3 | 10 | 2 |
| 4 | 3 | 3 | 10 | 1 |
| 5 | 10 | 10 | 3 | 2 |
| 6 | 10 | 10 | 3 | 1 |
| 7 | 3 | 3 | 10 | 2 |
| 8 | 10 | 10 | 3 | 2 |

TABLE 2-continued

| Arrival | Track | 1 | 2 | Level of Cache Hit |
|---------|-------|----|----|---------------------|
| 9 | 3 | 3 | 10 | 2 |

Table #2 shows the LRU stack for each I/O arrival, in the example of FIG. 1. Note that there are two hits at LRU level 1 and five hits at LRU level 2, as was calculated with reference to FIG. 1. The I/O rates for the two files do not need to be normalized to any specific time interval, since it is their ratio that is needed.

Example Using Measured Statistics

By assuming that file arrivals are independent of each other and that the re-reference statistics are independent, one can immediately calculate the cache hit rate for a number of files sharing the cache memory as long as there is sufficient cache memory to accommodate the re-references. Table 3 shows actual data measured on a banking system during a small, 143 second interval. The cache size was 16 Megabytes, which was sufficient to accommodate the 15 files reported in Table 3. For fifteen files, each using five tracks of 32,000 bytes, the cache size needed would have been about 2.4 MB.

TABLE 3

| File i | I/Os - $A_{ji}$ | Size (MB) | $\gamma_{i1}$ | $\gamma_{i2}$ | $\gamma_{i3}$ | $\gamma_{i4}$ | $\gamma_{i5}$ |
|---|---|---|---|---|---|---|---|
| 1 | 2 | .15 | 0.5 | 0.0 | 0.0 | 0.0 | 0.0 |
| 2 | 4 | 302.5 | 0.25 | 0.0 | 0.0 | 0.0 | 0.0 |
| 3 | 4 | 76.03 | 0.25 | 0.0 | 0.0 | 0.0 | 0.0 |
| 4 | 5 | 23.41 | 0.6 | 0.0 | 0.0 | 0.0 | 0.0 |
| 5 | 8 | 29.76 | 0.125 | 0.0 | 0.0 | 0.0 | 0.0 |
| 6 | 9 | 14.7 | 0.44 | 0.0 | 0.0 | 0.0 | 0.0 |
| 7 | 10 | 22.99 | 0.2 | 0.1 | 0.0 | 0.0 | 0.0 |
| 8 | 17 | 2.72 | 0.294 | 0.118 | 0.0 | 0.06 | 0.06 |
| 9 | 23 | 0.66 | 0.0 | 0.04 | 0.09 | 0.17 | 0.35 |
| 10 | 32 | 180.14 | 0.25 | 0.03 | 0.0 | 0.0 | 0.0 |
| 11 | 38 | 76.02 | 0.658 | 0.0 | 0.0 | 0.0 | 0.0 |
| 12 | 55 | 107.19 | 0.382 | 0.0 | 0.0 | 0.0 | 0.0 |
| 13 | 72 | 25.3 | 0.50 | 0.10 | 0.04 | 0.0 | 0.0 |
| 14 | 439 | 761.7 | 0.522 | 0.06 | 0.01 | 0.03 | 0.06 |
| 15 | 499 | 215.69 | 0.377 | 0.03 | 0.05 | 0.01 | 0.01 |

Using the above re-reference statistics, the cache hit rate is calculated as:

$$H = \frac{\sum_{i=1}^{15} \sum_{j=1}^{5} A_i \times \lambda_{ij}}{\sum_{i=1}^{15} A_i} = 54\% \qquad (5)$$

To calculate the probability of arrival by file $F_i$, we calculate:

$$\lambda_i = \frac{A_i}{\sum_{i=1}^{15} A_i} \qquad (6)$$

Using a prior art cache simulator, which read the I/O trace and simulated the LRU algorithm for the entire cache, the cache hit rate was calculated as 53.6%. Clearly, finding statistics for each file using LRU statistics is not in itself any more efficient than running the single LRU simulation as described in the Prior Art section of this application. What makes the novel technique of this invention useful, however, is that these statistics can be used directly to calculate the cache hit rate for various cache sizes and for various combinations of files. To re-calculate the cache hit rate given that chosen files will not be cached, repeat the above formula of equation (5) without including these chosen files. The above formula is quite simple given that there is sufficient cache size to accommodate the re-references. To calculate the cache hit rate where there is not sufficient cache memory size, we must calculate the probability that a file will occupy t tracks of the cache for t=1,2,3,4,5. Note that in this discussion, a maximum of five tracks are used for the evaluations. This is used to simplify the discussion. In its actual implementation, the re-reference statistics range over all of the tracks for each file. By inspecting the statistics in Table 3, one can see that five tracks' worth of statistics may be sufficient for many files, but some files may need more statistics.

The Probabilistic Model

If a single file occupied the cache memory and we knew the re-reference statistics, the calculation of the cache hit rate as a function of cache size would be trivial. Define $\gamma_j$ to be the re-reference statistics for all files in the cache, where j ranges over the total number of tracks, t, that can be held in cache memory. If File#1 is cached alone, then Pr [Re-reference/j tracks present in cache]=$\gamma_j$=$\gamma_{1j}$(8) for j=1,2,3, . . . t we can calculate $$Pr[\text{Cache Hit}/j] = \quad (9)$$

$Pr[\text{Re-reference}/j \text{ tracks in cache}] \, Pr[j \text{ tracks in cache}] =$ $$\begin{cases} \gamma_j & \text{for } j \leq t \\ 0 & \text{for } j > t \end{cases}$$

and therefore for a given size of cache, $k \leq t$, $$Pr[\text{CacheHit}] = \sum_{j=1}^{k} Pr[\text{Re-reference}/j \text{tracksincache}] \quad (11)$$

$$= \sum_{j=1}^{k} \gamma_j$$

Calculating the probability of a cache hit for more than one file is not this trivial. In general, the re-reference statistics for all files in the cache (denoted as a dot in place of a file index i) are calculated by adding one file at a time. In other words, the re-reference statistics are assigned the statistics of File#1 ($\gamma_j=\gamma_{1j}$) and the new re-reference statistics for the cache ($\gamma'_{\cdot j}$) are calculated using $\gamma_{\cdot j}$ and $\gamma_{2j}$. In other words $\gamma'_{\cdot j}$ is a function of $\gamma_{1i}$ and $\gamma_{2j}$. For additional files, $\gamma''_{\cdot j}$, $\gamma'''_{\cdot j}$ are calculated recursively. The arrival rate to the cache is updated to be the sum of the arrival rates for File#1 and File#2. As will be seen, calculating the statistics involves the analysis of a Birth-Death process or its corresponding discrete Markov process, or Markov chain. By keeping the number of files being evaluated to two, we reduce the number of states in the evaluation.

The Birth-Death process is used to show how, with each I/O arrival, the state of the cache changes. This change is only dependent on the previous state and the arrival of the I/O. To simplify the discussion, a process will be constructed to show how the two files compete for cache memory where cache memory can hold a maximum of one, two, and then three tracks.

The Birth-Death Process

With two files competing for cache memory, we will define the following probabilities:

The probability of File#1 occupying the one track is denoted as: $P_{1,1}^{(1)}$ where the superscript is the number of tracks, the first subscript is the file number and the second subscript is the number of tracks in cache. For a one track cache, $$P_{1,1}^{(1)} = P_{2,0}^{(1)}$$

$$P_{1,0}^{(1)} = P_{2,1}^{(1)} \quad (16)$$

To simplify the exposition, a graphical representation of cache will also be used. File#1 is represented as an X, while File#2 is an O. Therefore, $$P_{1,1}^{(1)} = P_{2,0}^{(1)} = X$$

$$P_{1,0}^{(1)} = P_{2,1}^{(1)} = O \quad (17)$$

For a two track cache we have:

$$P_{1,3}^{(2)} = P_{2,0}^{(2)} = XX$$

$$P_{1,2}^{(2)} = P_{2,1}^{(2)} = XO$$

$$P_{1,1}^{(2)} = P_{2,2}^{(2)} = OX$$

$$P_{1,0}^{(2)} = P_{2,3}^{(2)} = OO \quad (18)$$

For a three track cache we have:

$$P_{1,7}^{(3)} = P_{2,0}^{(3)} = XXX$$

$$P_{1,6}^{(3)} = P_{2,1}^{(3)} = XXO$$

$$P_{1,5}^{(3)} = P_{2,2}^{(3)} = XOX$$

$$P_{1,4}^{(3)} = P_{2,3}^{(3)} = XOO$$

$$P_{1,3}^{(3)} = P_{2,4}^{(3)} = OXX$$

$$P_{1,2}^{(3)} = P_{2,5}^{(3)} = OXO$$

$$P_{1,1}^{(3)} = P_{2,6}^{(3)} = OOX$$

$$P_{1,0}^{(3)} = P_{2,7}^{(3)} = OOO \quad (19)$$

Of use in carrying out this invention is that the graphical representation can be equated to the probability notation using binary arithmetic.

For the one track cache, the probability of having the track occupied by File#1 is simply the fraction of arrivals that are from File#1, or $$P_{1,1}^{(1)} = \frac{\lambda_1}{\lambda_1 + \lambda_2} \quad (20)$$

similarly, $$P_{1,0}^{(1)} = \frac{\lambda_2}{\lambda_1 + \lambda_2} \quad (21)$$

Figure 2:
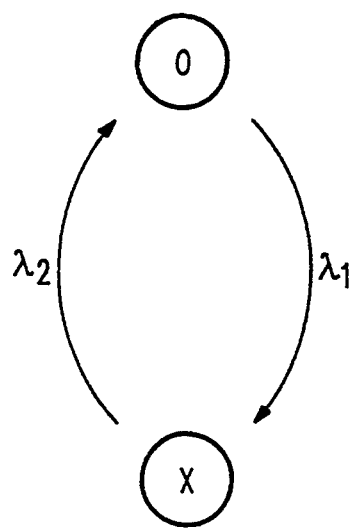
FIG. 2 is a depiction of a state transition diagram for a one-track cache memory.

These equalities can be derived from analyzing the Birth-Death process with the representation of FIG. 2, which is a state-transition diagram for a one track cache memory. As shown in FIG. 2, this system has two states—a first state where File#1 is using the cache memory and a second state when File#2 is using the cache memory. The typical technique used to solve this system is to solve the simultaneous equations:

$$\lambda_1 P_{1,0}^{(1)} = \lambda_2 P_{1,1}^{(1)}$$

$$P_{1,0}^{(1)} + P_{1,1}^{(1)} = 1 \tag{22}$$

Note that the solution depends solely on the probability of an arrival being from File#1 or File#2. Note also that, since the lambdas add to unity, $$\lambda_1 + \lambda_2 = 1 \tag{23}$$

then $$P_{1,1(1)} = \lambda_1 \text{ and } P_{1,0}^{(1)} = \lambda_2$$

Figure 3:
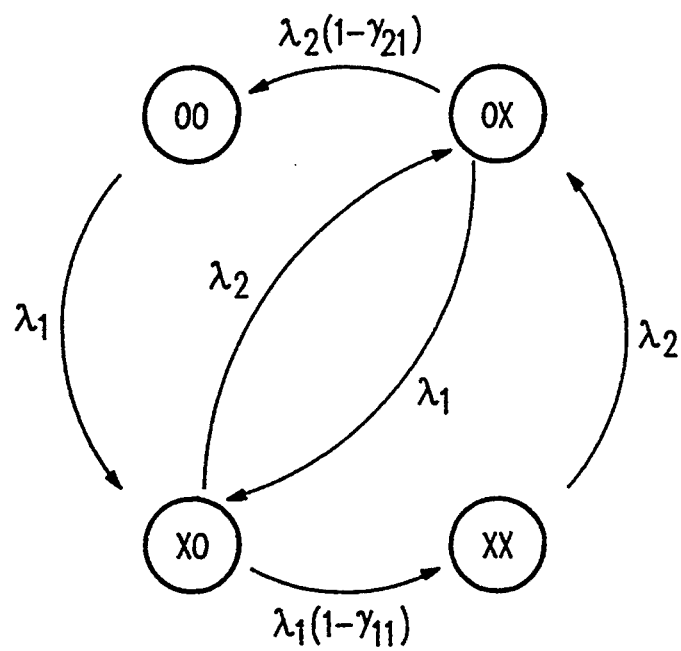
FIG. 3 shows a state-transition diagram of a cache memory having two tracks

When the cache size is increased to hold two tracks, the model becomes a bit more complex. FIG. 3 shows the state-transition diagram of such a cache memory having two tracks. Inspect the transition rate from state XO to XX. Compare this to the rate from OX to XO. Once an entry for File#1 is at the head of the LRU stack, there is a probability $\gamma_{11}$ that the next arrival will be a re-reference of File#1. If that is the case, then the state will not transition from XO to XX. Therefore, the rate of transition is the arrival rate for File#1 times the probability that there will not be a re-reference. The same notion applies to the transition from OX to OO. Otherwise, the transitions between the various states is fairly straight-forward.

The solution for this system can be accomplished using the following simultaneous equations:

$$\lambda_1 P_{1,0}^{(2)} = \lambda_2(1-\gamma_{21})P_{1,1}^{(2)}$$

$$P_{1,1}^{(2)}[\lambda_2(1-\gamma_{21})+\lambda_1] = \lambda_2[P_{1,3}^{(2)}+P_{1,2}^{(2)}]$$

$$P_{1,2}^{(2)}[\lambda_1(1-\gamma_{11})+\lambda_2] = \lambda_1[P_{1,1}^{(2)}+P_{1,0}^{(2)}]$$

$$\lambda_2 P_{1,3}^{(2)} = \lambda_1(1-\gamma_{11})P_{1,2}^{(2)}$$

$$P_{1,0}^{(2)}+P_{1,1}^{(2)}+P_{1,2}^{(2)}+P_{1,3}^{(2)} = 1 \tag{24}$$

The solution of this is simplified since we know that $$P_{1,1}^{(1)} = P_{1,2}^{(2)} + P_{1,3}^{(2)} = \frac{\lambda_1}{\lambda_1 + \lambda_2} \tag{25}$$

$$P_{1,0}^{(1)} = P_{1,0}^{(2)} + P_{1,1}^{(2)} = \frac{\lambda_2}{\lambda_1 + \lambda_2}$$

After some algebra, it can be shown that $$XX = P_{1,3}^{(2)} = \frac{\lambda_1}{\lambda_1+\lambda_2} \times \frac{\lambda_1(1-\gamma_{11})}{\lambda_1(1-\gamma_{11})+\lambda_2} \tag{26}$$

$$XO = P_{1,2}^{(2)} = \frac{\lambda_1}{\lambda_1+\lambda_2} \times \frac{\lambda_2}{\lambda_1(1-\gamma_{11})+\lambda_2}$$

$$OX = P_{1,1}^{(2)} = \frac{\lambda_2}{\lambda_1+\lambda_2} \times \frac{\lambda_1}{\lambda_1+\lambda_2(1-\gamma_{21})}$$

$$OO = P_{1,0}^{(2)} = \frac{\lambda_2}{\lambda_1+\lambda_2} \times \frac{\lambda_2(1-\gamma_{21})}{\lambda_1+\lambda_2(1-\gamma_{21})}$$

To simplify the notation, we will define the following: For m, n > 0 let $$\alpha_{mn} = \lambda_1 \left(1 - \sum_{k=1}^{m} \gamma_{1k}\right) + \lambda_2 \left(1 - \sum_{l=1}^{n} \gamma_{2l}\right) \tag{27}$$

and $$\alpha_{00} = \lambda_1 + \lambda_2 = 1 \tag{28}$$

then the solution for the two track model can be written in a more succinct form of:

$$XX = P_{1,3}^{(2)} = \frac{\lambda_1\lambda_1(1-\gamma_{11})}{\alpha_{10}} \tag{29}$$

$$XO = P_{1,2}^{(2)} = \frac{\lambda_1\lambda_2}{\alpha_{10}}$$

$$OX = P_{1,1}^{(2)} = \frac{\lambda_2\lambda_1}{\alpha_{01}}$$

$$OO = P_{1,0}^{(2)} = \frac{\lambda_2\lambda_2(1-\gamma_{21})}{\alpha_{01}}$$

Figure 4:
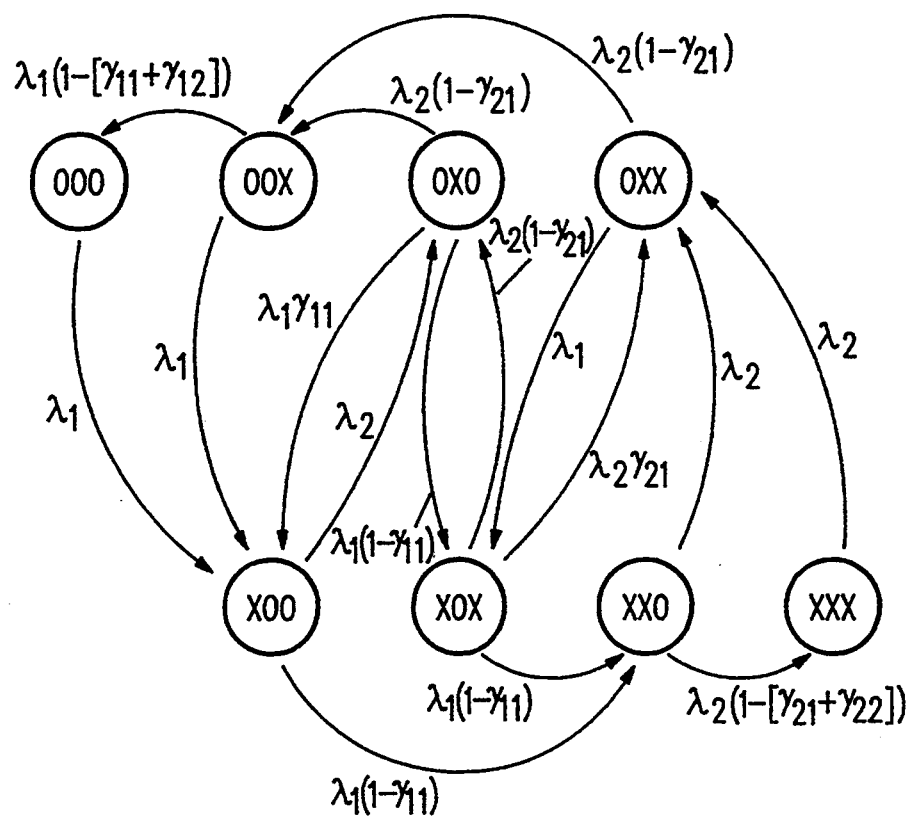
FIG. 4 is a state diagram for a three-track cache memory system.

For the three track cache, similar analysis used in the two track cache can be applied. FIG. 4 shows the Transition-State diagram for such a three track cache memory system. Note that the transition rate from state OXO to XOO is $\lambda_1\gamma_{11}$ Note that the only way to transition from OXO to XOO is if there is an arrival for File#1 and it re-references the one track occupied by File#1. The other transition rates are self-explanatory.

After considerably more algebra, it can be shown that the solution for the three track cache memory system is:

$$XXX = P_{1,7}^{(3)} = \frac{\lambda_1\lambda_1(1-\gamma_{11})\lambda_1(1-[\gamma_{11}+\gamma_{12}])}{\alpha_{10}\alpha_{20}} \tag{30}$$

$$XXO = P_{1,6}^{(3)} = \frac{\lambda_1\lambda_1(1-\gamma_{11})\lambda_2}{\alpha_{10}\alpha_{20}}$$

$$XOX = P_{1,5}^{(3)} = \frac{\lambda_1\lambda_2\lambda_1(1-\gamma_{11})}{\alpha_{10}\alpha_{11}}$$

$$XOO = P_{1,4}^{(3)} = \frac{\lambda_1\lambda_2\lambda_2(1-\gamma_{21})}{\alpha_{10}\alpha_{11}}$$

$$OXX = P_{1,3}^{(3)} = \frac{\lambda_2\lambda_1\lambda_1(1-\gamma_{11})}{\alpha_{01}\alpha_{11}}$$

$$OXO = P_{1,2}^{(3)} = \frac{\lambda_2\lambda_1\lambda_2(1-\gamma_{21})}{\alpha_{01}\alpha_{11}}$$

$$OOX = P_{1,1}^{(3)} = \frac{\lambda_2\lambda_2(1-\gamma_{21})\lambda_1}{\alpha_{01}\alpha_{02}}$$

$$OOO = P_{1,0}^{(3)} = \frac{\lambda_2\lambda_2(1-\gamma_{21})\lambda_2(1-[\gamma_{21}+\gamma_{22}])}{\alpha_{01}\alpha_{02}}$$

Fortunately, we do not have to keep solving simultaneous equations to solve the cache model for larger and larger cache sizes. The following recursion can be used in accordance with this invention.

Given the $P_{1,r}^{(t)}$, the probability of a specific state with the number of cache tracks equal to t, and assuming that there are m tracks being used by File#1 and n=(t−m) tracks being used by File#2, then $$P_{1,(2r-1)}^{(t+1)} = P_{1,r}^{(t)} \times \frac{\lambda_2 \left(1 - \sum_{i=1}^{n} \gamma_{2i}\right)}{a_{mn}} \quad (31)$$

$$P_{1,(2r)}^{(t+1)} = P_{1,r}^{(t)} \times \frac{\lambda_1 \left(1 - \sum_{i=1}^{m} \gamma_{1i}\right)}{a_{mn}}$$

Updating the Cache Re-Reference Statistics

Once the Birth-Death model is solved for a specific cache memory size, the cache re-reference statistics, $\gamma_{.1}'$ are calculated. In order to do this, we need to calculate the probability of a re-reference for each of the two files, given their probabilities of occupying various numbers of tracks in the cache memory. File#1 will be shown for the first three tracks. This is followed by a general algorithm for t traces, where t is the total number of tracks to be calculated.

Define $\gamma_{11}'$ as the fraction of I/Os arriving at cache memory (which will be used to cache File#1 and File#2) that are from File#1 and will be a cache hit at the head of the LRU stack. This is the fraction of I/Os from File#1 that were found at the head of its LRU stack times the probability that File#1 will be at the head of the cache (as opposed to File#2). Therefore, $$\gamma'_{11} = \gamma_{11} P_{1,1}^{(1)} \quad (32)$$

Similarly, $$\gamma'_{21} = \gamma_{21} P_{1,0}^{(1)} \quad (33)$$

We can now calculate the fraction of I/Os to the cache, which has File#1 and File#2, that will result in a cache hit at the first slot of the LRU stack.

$$\gamma'_{0.1} = \lambda_1 \gamma'_{11} + \lambda_2 \gamma'_{21} \quad (34)$$

For the remainder of these calculations, we will focus on the cache hits resulting from I/Os that arrive for File#1. The analysis for File#2 is analogous. To calculate the fraction of I/Os that will result in a cache hit at the second slot of the combined cache memory, we will need to consider the fraction of I/Os that were originally satisfied at the head of the LRU stack for File#1 and the fraction of I/Os that were satisfied at the second slot of the LRU stack: $\gamma_{11}$, $\gamma_{12}$. These I/Os will result in a cache hit in the second slot of the combined cache memory if we have the states OX and XX respectively. Therefore, $$\gamma'_{12} = \{\gamma_{11} P_{1,1}^{(2)} + \gamma_{12} P_{1,3}^{(2)}\} \quad (35)$$

Similarly, for three tracks, the I/Os for File#1 that will be satisfied at the third slot of the combined cache will need the states OOX, OXX and XXX. Therefore, $$\gamma'_{13} = \{\gamma_{11} P_{1,1}^{(3)} + \gamma_{12} P_{1,3}^{(3)} + \gamma_{13} P_{1,7}^{(3)}\} \quad (36)$$

This process can be continued until all cache tracks are considered. Now, for any $t \leq n$, the probability of a cache hit given t tracks of cache memory is:

$$Pr[\text{CacheHit} | t \text{ tracks}] = \sum_{i=1}^{t} \gamma'_{.i} \quad (38)$$

Thus, in accordance with the teachings of this invention, the probabilities can then be calculated for each new file added to the cache memory.

Validation of the Model

Discrete event simulations were run to validate the analytic model. The following model is an example of the validation. It is one of many that were run during the development of this invention.

$$\lambda = \begin{bmatrix} .5 \\ .5 \end{bmatrix} \quad (39)$$

$$\gamma = \begin{bmatrix} 1.0 & 0.0 & 0.0 & 0.0 & 0.0 \\ 0.2 & 0.2 & 0.2 & 0.2 & 0.2 \end{bmatrix}$$

The following simulation results used ten independent runs of 1000 I/Os each. The confidence intervals were calculated using a Student-T distribution with nine degrees of freedom and a significance level of 95%.

The results of the above modeling procedure were:

$$\gamma' = [0.3000 \; 0.2111 \; 0.1556 \; 0.1238] \quad (41)$$

Space and Time Considerations for the Model

Although the above procedures have been implemented in software, the number of calculations necessary to calculate cache hit rates for very large caches is quite large if the algorithms are implemented directly. Specifically, the calculations of the state probabilities is on the order of $2^t$ where t is the number of tracks. For a sixteen megabyte cache, with cache tracks equal to 32,000 bytes each, there is room for 500 tracks. The calculations will exceed $10^{150}$. With the above analysis, all probabilities for all possible combinations of slot occupation by two files must be calculated. In this section, a recursive solution is presented which reduces the complexity of calculations from order $2^n$ to the order of $n^2$. This simplification makes it possible to calculate cache hit probabilities in real time (while I/Os are occurring). If a 500 track cache is being used, 250,000 calculations does not impose an undue burden to current CPUs.

The simplification uses the conditional probability that, given that a file is occupying the last slot of a cache of size $n = 1, 2, 3, \ldots, T$, then it occupies m more slots of the cache, where $m < n$. T is the maximum size of the cache under consideration. Define $O(m|n)$ as the probability of occupying m other slots given that it occupies the last slot of a cache of size n. In order to simplify notation, we will define the discrete survival function $$S_{im} = 1 - \sum_{j=0}^{m} \gamma_{ij} \quad (42)$$

where $i = 1, 2$ is the file number and $m = 0, 1, 2 \ldots$ and, by definition, $$S_{io} = 1$$

We can then re-define $$\alpha_{ij} = \lambda_1 S_{1i} + \lambda_2 S_{2j} \text{ where } i,j = 0, 1, 2, \ldots \quad (43)$$

Finally, we will define $$O_1(m|n) = \quad (44)$$

$$\frac{\lambda_1 S_{1m}}{\alpha_{m,n-(m+1)}} O_1(m-1|n-1) + O_2(n-(m+2)|n-1)$$

$$O_2(m|n) = \quad (45)$$

$$\frac{\lambda_2 S_{2m}}{\alpha_{n-(m+1),m}} O_1(n-(m+2)|n-1) + O_2(m-1|n-1)$$

where $n = 1, 2, 3, \ldots, T$ and, by definition, $$O_i(-1|n) = 0 \text{ for } i=1,2 \text{ and } n=0, 1, 2, \ldots, T$$

Note that this is a recursive approach to solving the problem. The solution for m=1 is solved first for File#1 and File#2. Then the solution for m=2 is solved using the previous solution, and so on. It can be proven (using induction) that this provides the same exact solution as the probabilistic model presented in the last section. It can also be shown that this algorithm is of order $n^2$. The following example will show how a practitioner would implement this solution.

Assume $$\lambda = \left(\frac{5}{6}, \frac{1}{6}\right) = (.8\overline{33}, .16\overline{6})$$

$$\gamma = \begin{pmatrix} .5 & .25 & .1 & .05 & .03 & .01 \\ .4 & 0 & 0 & 0 & 0 & 0 \end{pmatrix}$$

Then the values for the survival functions are:

$S_1 = (1\ 0.5\ 0.25\ 0.15\ 0.1\ 0.07\ 0.06)$ $S_2 = (1\ 0.6\ 0.6\ 0.6\ 0.6\ 0.6\ 0.6)$

The corresponding alpha values are calculated as:

$$\alpha = \begin{pmatrix} 1 & .9\overline{33} & .9\overline{33} & .9\overline{33} & \ldots & \ldots \\ .583 & .51\overline{6} & .51\overline{6} & .51\overline{6} & \ldots & \ldots \\ .375 & .308\overline{3} & .308\overline{3} & .308\overline{3} & \ldots & \ldots \\ .291\overline{6} & .225 & .225 & .225 & \ldots & \ldots \\ .25 & .18\overline{3} & .18\overline{3} & .18\overline{3} & \ldots & \ldots \\ \ldots & \ldots & \ldots & \ldots & \ldots & \ldots \end{pmatrix}$$

Considering a one track cache, $$O = O_2(0|1) = \frac{\lambda_2 S_{20}}{\alpha_{00}} O_1(-1|0) + O_2(-1|0) \quad (46a)$$
$$= \lambda_2 = .16\overline{6}$$

$$X = O_1(0|1) = \frac{\lambda_1 S_{10}}{\alpha_{00}} \quad (46b)$$
$$= \lambda_1 = .8\overline{33}$$

To solve for a two-track cache, $$OX = O_1(0|2) = \frac{\lambda_1 S_{10}}{\alpha_{01}} O_1(-1|1) + O_2(0|1) \quad (47a)$$
$$= .148\overline{8}$$

$$XO = O_2(0|2) = \frac{\lambda_2 S_{10}}{\alpha_{10}} O_1(0|1) + O_2(-1|1) \quad (47b)$$
$$= .23809$$

$$XX = O_1(1|2) = \frac{\lambda_1 S_{11}}{\alpha_{10}} O_1(0|1) + O_2(-1|1) \quad (47c)$$
$$= .5952$$

$$OO = O_2(1|2) = \frac{\lambda_2 S_{21}}{\alpha_{01}} O_1(-1|1) + O_2(0|1) \quad (47d)$$
$$= .01786$$

To solve for a three-track cache, $$OOX = O_1(0|3) = \frac{\lambda_1 S_{10}}{\alpha_{02}} \{O_1(-1|2) + O_2(1|2)\} \quad (48a)$$
$$= .01595$$

$XOX$
$OXX =$ $$O_1(0|3) = \frac{\lambda_1 S_{11}}{\alpha_{11}} \{O_1(0|2) + O_2(0|2)\} \quad (48b)$$
$$= .312$$

$$XXX = O_1(2|3) = \frac{\lambda_1 S_{12}}{\alpha_{20}} \{O_1(1|2) + O_2(-1|2)\} \quad (48c)$$
$$= .33067$$

$OXO$
$XOO =$ $$O_2(1|3) = \lambda_2 \frac{S_{21}}{\alpha_{11}} \{O_1(0|2) + O_2(0|2)\} \quad (48d)$$
$$= .07486$$

$$XXO = O_2(0|3) = \lambda_2 \frac{S_{20}}{\alpha_{20}} \{O_1(1|2) + O_2(-1|2)\} \quad (48e)$$
$$= .2645$$

$$OOO = O_2(2|3) = \frac{\lambda_2 S_{22}}{\alpha_{02}} \{O_1(-1|2) + O_2(1|2)\} \quad (48f)$$
$$= .001913$$

To calculate the new re-reference statistics, $\gamma'_{11} = O_1(0|1)\gamma_{11} = 0.41\overline{6}$ $\gamma'_{21} = O_2(0|1)\gamma_{21} = 0.06\overline{6}$ $\gamma'_{0.1} = \lambda_1 \gamma'_{11} + \gamma_2 \gamma'_{21} = 0.358\overline{3}$ $\gamma'_{12} = O_1(0|2)\gamma_{11} + O_1(1|2)\gamma_{12} = 0.22324$ $\gamma'_{22} = O_2(0|2)\gamma_{21} + O_2(1|2)\gamma_{22} = 0.09523$ $\gamma'_{0.2} = \lambda_1 \gamma'_{12} + \lambda_2 \gamma'_{22} = 0.2019$ $\gamma'_{13} = O_1(0|3)\gamma_{11} + O_1(1|3)\gamma_{12} + O_1(2|3)\gamma_{13} = 0.119042$ $\gamma'_{23} = O_2(0|3)\gamma_{21} + O_2(1|3)\gamma_{22} + O_2(2|3)\gamma_{23} = 0.1058$ $\gamma'_{0,3} = \lambda_1 \gamma'_{13} + \lambda_2 \gamma'_{23} = 0.11683$ Finally, the total cache hit rate for File#1 and File#2 in a three track cache is:

$$H = \sum_{t=1}^{3} \lambda_1 \gamma'_{1t} + \lambda_2 \gamma'_{2t} \tag{49}$$

In general, the total cache hit rate for File#1 and File#2 in a cache of length T is:

$$H = \sum_{t=1}^{T} \left\{ \lambda_1 \left[ \sum_{v=0}^{t-1} \gamma_{1,v+1} O_1(v|t) \right] + \lambda_2 \left[ \sum_{v=0}^{t-1} \gamma_{2,v+1} O_2(v|t) \right] \right\} \tag{50}$$

Since memory allocation for storing the re-reference statistics may require more space than desired, one may fit the re-reference statistics to a simpler distribution function. For example, the statistics can be fit to a third degree polynomial of the form: $\gamma_{.x} = C_0 + C_1 x + C_a x^2 + C_3 x^3$, where $X = 1, 2, 3, \ldots T$

Selecting the Optimal File for Caching

Without the model of this invention described above, there has been no rigorous technique for ranking files in order of best to worst candidate for caching. In McNutt's references, the selection of data pools is suggested using residual times. The model of this invention shows that residual time is, by itself, only a relative measure that does not establish a rank for each file independently of the others. Using the model of this invention and examining the model under specific limiting conditions, we can justify a rigorous method for ranking files. This is very useful in a real-time implementation where the storage subsystem, on a regular basis, is to decide which data sets are to be included or excluded from cache. As was previously noted, calculating the conditional probabilities is not computationally intensive. To further simplify computations, if a system is to try to achieve an optimal cache hit rate, the ranking of the files can be performed without establishing the resulting cache hit rate. All that needs to be done is to choose the best candidates. Whatever the resulting cache hit rate, we can guarantee that the hit rate will be optimal for the optimal files.

One useful implementation is to monitor the cache hit rate, choose an optimal set of files to include, choose the least optimal files to exclude, and then measure the hit rate again after a small time duration.

If we are given the re-reference statistics for a number of files, we need a technique to rank them with the best cache candidate ranked highest and the worst candidate ranked lowest.

The technique is now described as a feature of this invention, and an example will be presented to show it's underlying ideas. We will start with the arrival rate and re-reference statistics for the cached disk defined as File#2. We will use two sets of re-reference statistics for File#1, both with the same arrival rates. We then consider two experiments. The difference between these two experiments is that we re-arrange the re-reference statistics for File#1. The total of the re-reference statistics for File#1 is kept constant.

Experiment G1
$\lambda = (.8\overline{33}, .1\overline{66})$ $\gamma = \begin{bmatrix} .6 & .3 & .05 \\ .2 & .2 & .2 \end{bmatrix}$ Experiment G2
$\lambda = (.8\overline{33}, .1\overline{66})$ $\gamma = \begin{bmatrix} .3 & .6 & .05 \\ .2 & .2 & .2 \end{bmatrix}$ The results of running the model are as follows:

TABLE 3

| Cache Tracks | Total Cache Hit Rate | |
|---|---|---|
|  | G1 | G2 |
| 1 | .42 | .21 |
| 2 | .63 | .58 |
| 3 | .75 | .75 |
| 4 | .81 | .81 |
| 5 | .85 | .84 |
| 6 | .87 | .87 |
| 7 | .89 | .89 |
| 100 | .89 | .89 |

A Ranking function is defined as:

$$R_i = \sum_{T-1}^{t=0} (T - t) \times \gamma_{i,t} \tag{51}$$

for all values of T where the gammas are non-zero.

Using this approach, the G1 statistics would be chosen. A general heuristic for choosing files, given a current set of re-reference statistics for the disk, is the following. Select all files whose rank is greater than the rank of the disk. After selecting these files, re-rank the files using the ranking function times the arrival rate. In this way, the file with the highest arrival rate that will improve the disk cache hit rate will be selected.

The above heuristic has not been proven to work in all cases. The only certain way of picking the optimal file is to re-calculate the LRU model using the current disk statistics as one file and the candidate file for the other file and calculating the total cache hit rate. Since this can be performed in $\theta(n^2)$ operations, the re-running of the model for the most active files will not require significant CPU power.

Conclusion

The uniqueness of this invention is that it provides algorithms that can be directly implemented in software for constructing a precise model that can be used to predict cache hit rates for a cache using statistics that can be accumulated for each element of the cache independently. In the above discussion, disk cache has been used as an example, with files being the elements considered. The same algorithms can be used to model main CPU memory cache or the caching of tape cartridges.

In addition to providing these new algorithms, it is shown how the underlying model can be used to construct algorithms that can be used to rank the elements to find the best candidates for caching.

Figure 5:
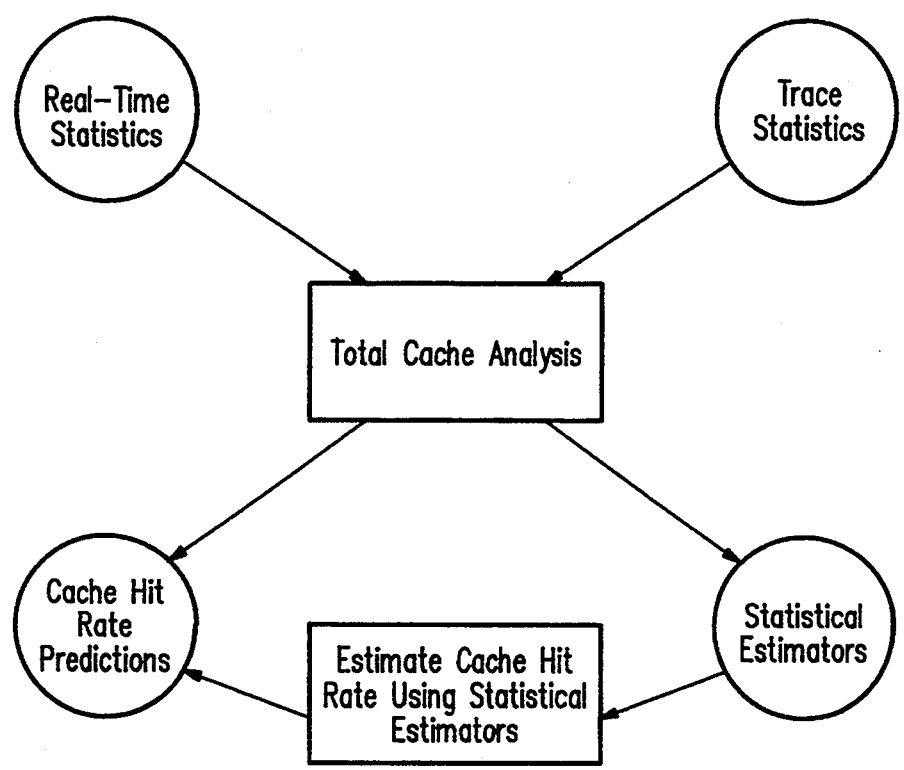
FIG. 5 is block diagram depicting the cache analysis system of the prior art.
Figure 6:
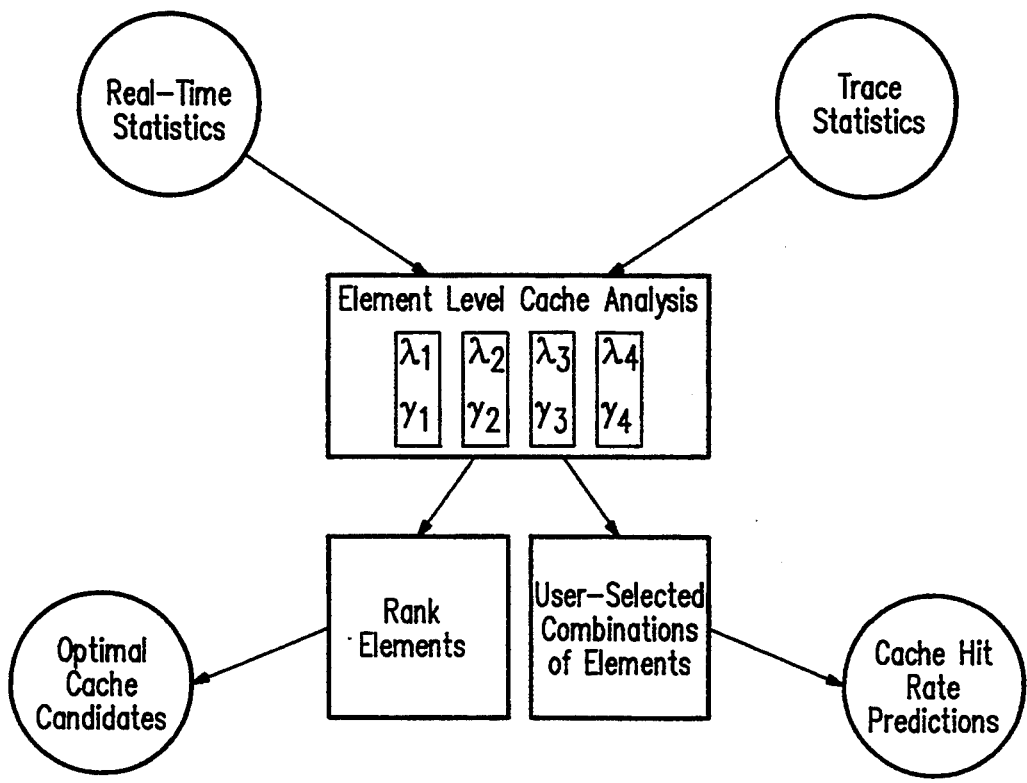
FIG. 6 is a block diagram depicting one embodiment of a cache analysis system according to the present invention.

FIGS. 5 and 6 graphically show the difference between the prior art (FIG. 5) and this invention method (FIG. 6) for analyzing the effectiveness of cache. A cache can be used for CPU memory, disk drives, tape drives, or any system where a Least Recently Used (LRU) algorithm is applied. In any of these systems, there are collections of information which are accessed by a user. These collections are referred to as the elements of the cache, since it is the smallest partition in which the user considers information. For disks, these elements would be files. For tape libraries, these elements would be tape cartridges. For CPU memory, these elements may be pages of memory belonging to a single program or user code. The majority of the current practitioners who evaluate the effectiveness of cache do the analysis by measuring the entire cache's cache hit rate. The cache hit rate is usually gathered by a computer system's operating system (Real-Time Statistics) and output as raw data to be read by the practitioner.

In some cases, when modeling proposed changes to the cache (such as cache size), the trace statistics are used. Trace statistics show the arrivals at the LRU stack. Using a simulation, the effectiveness of various cache sizes can be modeled and the cache hit rate predicted. In other cases, the trace statistics are used to provide estimators for the performance of the entire cache, which can then be used in statistical models to estimate and predict the cache hit rate. All of these techniques are shown graphically in FIG. 5.

The method of this invention (see FIG. 6) is to use either real-time statistics from an operating system or use the trace data to find statistics that are independent for each element of the cache. Instead of considering the cache as a whole, the average arrival rates (lambdas) and re-reference statistics (gammas) for each element are estimated. These estimates can then be used in two ways. First, they can be used to consider various combinations of the elements and cache sizes in predicting the cache hit rate. In other words, one may want to consider what the cache hit rate would be for five specific files. The cache hit rate can be directly calculated (using an exact analytical model) using the five files' arrival rates and re-reference statistics with no need for additional LRU simulation. The arrival rates and re-reference statistics are the necessary statistics for the model. This could not be done using the prior art methods. Secondly, these statistics can be used to rank the elements of the cache to find the set that produces the optimal (highest) cache hit rate. This could not be calculated using the prior art methods since the necessary statistics had never been identified.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit of the invention.

What is claimed is:

1. A method for operating a computer system including a mass memory, and a plurality of independent elements stored in said mass memory, for determining performance of said computer system should one or more of said elements be cached in a cache memory using a Least Recently Used (LRU) algorithm, said method comprising the steps of:
   utilizing said computer system to collect a set of re-reference statistics and arrival rate statistics for said plurality of independent elements, said re-reference and arrival rate statistics pertaining to each element independently;
   using said computer system to create a probabilistic model based upon said set of re-reference and arrival rate statistics; and
   using said computer system to manipulate said probabilistic model to predict cache hit rate of one or both alterations consisting of including or excluding one or more of said independent elements from cache memory, and cache memory size.

2. A method as in claim 1 which further comprises the step of manipulating said model and thereby determining which one or more of said independent elements should preferably be cached.

3. A method as in claim 1 which further comprises the step of ranking said one or more independent elements which should preferably be cached, based upon a predicted improvement in computer system operating performance upon caching each of said independent elements.

4. A method as in claim 1 wherein said step of collecting is performed during normal operation of said computer system, based upon usage of said one or more independent elements.

5. A method as in claim 1 wherein said mass memory has a size greater than and an operating speed less than said cache.

6. A method as in claim 1 wherein said mass memory comprises a disk and said cache comprises solid state memory.

7. A method as in claim 1 wherein said mass memory comprises a tape library and said cache comprises tape drives.

8. A method as in claim 1 wherein said mass memory comprises CPU memory pages, and said cache comprises CPU memory cache.

9. A method as in claim 1 wherein for each independent element for which said statistics are determined:
   said arrival rate statistics define a fraction of accesses for said independent element with respect to total number of accesses for all independent elements; and
   said re-reference statistics define a fraction of re-reference accesses of each independent element with respect to total number of accesses for said independent element.

10. A method as in claim 1 wherein said step of gathering statistics comprises the step of utilizing a Least Recently Used (LRU) stack for each said independent element, said LRU stack containing a plurality of positions indicating recency of use of various portions of said independent element.

11. A method as in claim 1 wherein an overall cache hit rate is calculated using said re-reference statistics and arrival rate.

12. A method as in claim 1 wherein said selection of independent elements for caching is determined using said re-reference statistics.

13. A method as in claim 4 wherein said step of collecting is performed in real time.

14. A method as in claim 4 wherein said step of collecting is performed utilizing an I/O trace of a previous period of operation of said computer system.

15. A method as in claim 1 wherein said step of predicting comprises the step of modelling a plurality of cache sizes, using said statistics.

16. A method as in claim 3 wherein the ranks of said independent elements are determined by:

using said re-reference statistics, select all independent elements having rank greater than the rank of the mass memory; and re-ranking said selected independent elements using a ranking function times said arrival rate.

17. A method as in claim 3 wherein said independent elements are ranked based upon said re-reference statistics.

18. A method as in claim 17 wherein said independent elements are ranked based upon a ranking function defined as $$R_i = \Sigma \frac{t=0}{T-1} (T-t) \times \gamma_{i,t}$$

where:
  $R_i$ = the ranking of ith element;
  t = the index of the summation;
  T = the number of LRU slots; and
  $\gamma_{it}$ = re-reference statistics for element i.

19. A method as in claim 17 wherein said independent elements are ranked based upon a probability that an independent element is occupying other LRU slots given that the independent element occupies the last LRU slot.

* * * * *